W. C. BURTON.
COTTON CHOPPER.
APPLICATION FILED NOV. 21, 1910.
1,002,494.
Patented Sept. 5, 1911.
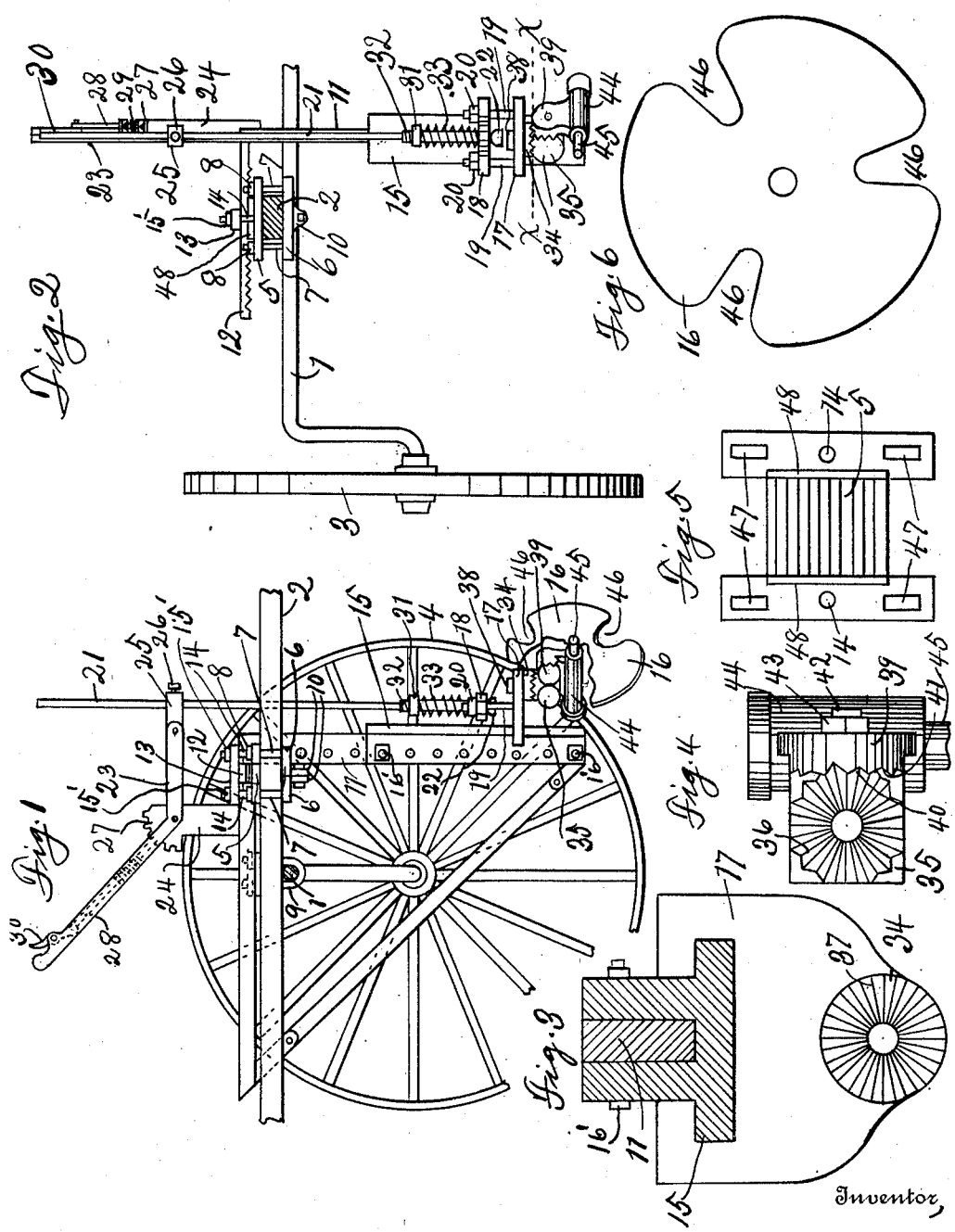

UNITED STATES PATENT OFFICE.

WALTER C. BURTON, OF FORT WORTH, TEXAS.

COTTON-CHOPPER.

1,002,494.  Specification of Letters Patent.  Patented Sept. 5, 1911.

Application filed November 21, 1910. Serial No. 593,452.

*To all whom it may concern:*

Be it known that I, WALTER C. BURTON, a citizen of the United States, residing at Fort Worth, in the county of Tarrant and State of Texas, have invented certain new and useful Improvements in Cotton-Choppers, of which the following is a specification.

This invention relates to cotton choppers and more particularly to a disk which is used to chop the cotton, and the object is to provide simple devices which can be readily attached to and detached from the tongue of a cultivator. Means are provided for vertical adjustment of the disk by which the adjustment of the disk will be under the immediate control of the operator. Means are also provided for fixed vertical adjustments of the disk. Means are provided for lateral adjustment of the disk on the tongue of the cultivator or other vehicle. Means are provided for vertical yielding of the disk.

Other objects and advantages will be fully explained in the following description and the invention will be more particularly pointed in the claims.

Reference is had to the accompanying drawings which form a part of this application.

Figure 1 is a side elevation of the cotton chopper attachments, the disk being broken away to show the manner of mounting the same, and only enough of a wheeled vehicle being shown to illustrate the manner of mounting the attachments. Fig. 2 is a front elevation of the attachments, the disk being omitted and only a part of the cultivator frame being shown. Fig. 3 is a horizontal section, taken along the line $x$—$x$ of Fig. 2 and inverted Fig. 4 is a plan view of the double adjusting member and the disk adjusting member and bearing. Fig. 5 is a plan view of a corrugated beam plate. Fig. 6 is a side elevation of a disk used for chopping.

Similar characters of reference are used to indicate the same parts throughout the several views.

Parts of a wheeled frame consisting of the arched axle 1, tongue or beam 2, and wheels 3 and 4, are illustrated in the drawings for the purpose of showing the manner of using the cotton chopper. The cotton chopper is mounted on the tongue 2 by means of a corrugated plate 5 which is clamped on the tongue or beam at any suitable point by bars 6 with integral lugs or bolts 7 and with nuts 8. The tongue 2 may be secured to the axle 1 in any suitable manner, as by U-bolts 9. The bars 6 may be further secured to the tongue 2 by means of integral lugs 10 which may be bolted together. The stock 11 is mounted on the plate 5 by means of a horizontally projecting arm 12 which is corrugated on the underside to mesh with the corrugations of the plate 5. The arm 12 is clamped on the plate 5 by means of a bar 13 and by bolts or lugs 14 which may be integral with plate 5. Nuts 15′ engage the bolts 14. By reason of the corrugations on the underside of the arm 12, the plow stock 11 can be laterally adjusted on the tongue 2. A guide or track 15 for vertical adjustment of the disk 16 is fixedly attached to the stock 11. The stock 11 has a series of perforations and the guide 15 is attached thereto at the desired height by bolts 16′. The disk 16 is fixedly mounted on a carrier 17 which is movable vertically on the track or guide 15. The guide 15 is made adjustable on the stock 11 so that the travel or beat of the carrier 17 may be varied. The carrier 17 is attached to a yoke 18 by bolts 19 which may be integral with the carrier. Nuts 20 engage the bolts 19. The carrier is adjusted vertically by a rod 21 which projects loosely through the yoke 18 and is provided with a head 22 which supports the yoke 18. The rod 21 is moved vertically by a bell-crank lever 23 which is fulcrumed on the bearing post 24. The lever 23 is pivotally connected to the rod 21 by means of a clamp 25 which is pivotally connected to the lever. The clamp 25 is held at different adjustments on the rod 21 by a set screw 26. The lever 23 is held at different positions by a ratchet 27 and dog 28 of ordinary construction. The ratchet and dog are provided with the usual spring 29 and hand grip 30. The carrier 17 can thus be set at any desirable location on the guide 15. Provision is made for a yielding motion of the carrier 17. A nut 31 is screwed on an enlarged portion 32 of the rod 21 and a spring 33 normally presses the yoke 18 down on the head 22 of the rod, but in case of obstructions, such as roots or rocks, the yoke 18 will yield upwardly so that the disk 16 will not be broken or other parts of the chopper disarranged.

Means are provided for vertical and horizontal adjustment of the disk 16, that is, so that the disk may be set at a greater or less angle to the row of plants and may be set at a greater or less angle to the ground. A ratchet disk 34 is formed integral with the underside of the carrier 17 and a ratchet block 35 is provided with teeth 36 which are adapted to mesh with the corrugations 37 in the disk 34. This mechanism provides for the horizontal adjustment of the disk. The block 35 is secured to the carrier 17 by a bolt 38. By the means thus described the disk can be set at any desirable angle to the row of plants. The vertical inclination of the disk 16 is accomplished by the bearing block 39. The ratchet block 35 has a toothed face 40 which engages a corrugated face 41 of the bearing block 39. The bearing block 39 may be secured to the ratchet block 35 by means of a bolt 42 and a nut 43. The block 39 has a bearing 44 and this bearing can be set at any desirable angle by reason of the corrugated face 41 of the block 39 and the toothed face 40 of the ratchet block 35. The disk 16 is mounted in the bearing by means of a shaft 45.

The means for operating and carrying the disk are designed to operate the disk directly on the row of plants and cut-outs or notches 46 are made in the disk for leaving plants at the desired distance apart, the cutting portions 48 of the disk taking all plants not wanted. It is apparent that the disk can have more or less notches and may be used for thinning out any plants that are growing in rows.

The plate 5 is provided with slots 47 to adapt the plate to different widths of tongues. The plate 5 is also provided with upwardly projecting flanges 48 to prevent forward displacement of the arm 12 on the plate. The bolts 7 project through the slots 47 and the slots permit adjustment of the plate relative to the tongue.

Having fully described my invention, what I claim as new and desire to secure by Letters Patent, is,—

1. A cotton chopper comprising a wheeled vehicle provided with a tongue, a stock having a horizontal arm, means for attaching said arm to said tongue at different adjustments, a guide and means for attaching the same at different points of adjustment on said stock, a disk carrier and means for setting the same at different points of adjustment on said guide, a bearing, means for fixedly attaching said bearing to said carrier at different angles and different inclinations on said carrier, and a disk mounted on said bearing.

2. A cotton chopper comprising a wheeled vehicle provided with a tongue, a stock and means for attaching the same to said tongue at different lateral adjustments, a guide and means for attaching the same to said stock at different points of adjustment, a carrier operatively connected with said guide, a ratchet lever and a rod for setting said carrier at different vertical adjustments on said guide, a bearing, means for fixedly attaching said bearing to said carrier at different angles and different inclinations, and a disk journaled in said bearing.

3. A cotton chopper comprising a wheeled vehicle provided with a tongue, a stock and means for attaching said stock to said tongue at different lateral adjustments, a guide and means for attaching said guide to said stock at different vertical adjustments, a carrier operatively connected with said guide, a ratchet lever and a rod for setting said carrier at different vertical adjustments, a yoke connected to said carrier, a spiral spring attached to said rod and pressing against said yoke and said rod passing loosely through said yoke to give upward yielding motion to said carrier, and a disk operatively connected to said carrier.

4. A cotton chopper comprising a wheeled vehicle provided with a tongue, a stock and means for attaching the same to said tongue at different lateral adjustments, a grooved T-shaped guide and means for attaching the same to said stock at different vertical adjustments, a carrier and means for operatively connecting said carrier with said guide fixedly against downward movement but permitting upwardly yielding movement of the carrier, and a disk operatively connected with said carrier.

5. A cotton chopper comprising a wheeled vehicle provided with a tongue, a stock and means for attaching the same to said tongue at different lateral adjustments, a grooved T-shaped guide attached to said stock, a carrier and means for operatively connecting said carrier with said guide fixedly against downward movement but permitting upward yielding movement of the carrier, a ratchet block and means for attaching the same to said carrier at different angles horizontally, a bearing block and means for attaching the same to said ratchet block at different angles vertically, and a notched disk operatively connected with said bearing block.

6. A cotton chopper comprising a wheeled vehicle provided with a tongue, a stock and means for attaching the same to said tongue at different lateral adjustments consisting of a horizontally projecting arm having the underside thereof corrugated, a plate clamped on said tongue and having corrugations meshing with the corrugations of said arm and upwardly projecting flanges preventing displacement of said arm on said plate, means for binding said arm on said plate, a carrier operatively connected with said stock, and a notched disk operatively connected with said carrier.

In testimony whereof, I set my hand in the presence of two witnesses, this 18th day of November, 1910.

WALTER C. BURTON.

Witnesses:
A. L. JACKSON,
J. W. STITT.

Copies of this patent may be obtained for five cents each, by addressing the "Commissioner of Patents, Washington, D. C."